US008301827B2

(12) United States Patent
Yeh

(10) Patent No.: US 8,301,827 B2
(45) Date of Patent: Oct. 30, 2012

(54) DATA READ METHOD FOR PROCESSING A PLURALITY OF HOST READ COMMANDS, AND FLASH MEMORY CONTROLLER AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 522 days.

(21) Appl. No.: 12/614,662

(22) Filed: Nov. 9, 2009

(65) Prior Publication Data
US 2011/0072193 A1 Mar. 24, 2011

(30) Foreign Application Priority Data
Sep. 24, 2009 (TW) .............................. 98132338 A

(51) Int. Cl.
G06F 12/02 (2006.01)
G06F 13/00 (2006.01)
(52) U.S. Cl. ........ 711/103; 711/154; 711/167; 711/206; 711/E12.008; 365/230.03; 365/189.04
(58) Field of Classification Search .................. None
See application file for complete search history.

(56) References Cited

U.S. PATENT DOCUMENTS

| 2007/0214298 A1* | 9/2007 | Sullivan et al. ............... 710/110 |
| 2009/0037652 A1* | 2/2009 | Yu et al. ........................ 711/103 |
| 2009/0150894 A1* | 6/2009 | Huang et al. .................. 718/104 |
| 2010/0262760 A1* | 10/2010 | Swing et al. ................... 711/103 |

* cited by examiner

Primary Examiner — Michael Krofcheck
(74) Attorney, Agent, or Firm — J.C. Patents

(57) ABSTRACT

A data read method for reading data to be accessed by a host system from a plurality of flash memory modules is provided. The data read method includes receiving command queuing information related to a plurality of host read commands from the host system, each of the host read commands is corresponding to one of a plurality of data input/output buses coupled to the flash memory modules. The data read method also includes re-arranging the host read commands and generating a command giving sequence according to the data input/output buses corresponding to the host read commands. The data read method further includes sequentially receiving and processing the host read commands from the host system according to the command giving sequence and pre-reading data corresponding to a second host read command. Thereby, the time for executing the host read commands can be effectively shortened.

25 Claims, 12 Drawing Sheets

DATA READ METHOD FOR PROCESSING A PLURALITY OF HOST READ COMMANDS, AND FLASH MEMORY CONTROLLER AND STORAGE SYSTEM USING THE SAME

CROSS-REFERENCE TO RELATED APPLICATION

This application claims the priority benefit of Taiwan application serial no. 98132338, filed on Sep. 24, 2009. The entirety of the above-mentioned patent application is hereby incorporated by reference herein and made a part of specification.

BACKGROUND

1. Technology Field

The present invention generally relates to a data read method of a flash memory, and more particularly, to a data read method for reading data from a plurality of flash memory modules and a flash memory controller and a flash memory storage system using the same.

2. Description of Related Art

Flash memory is one of the most adaptable memories for battery-powered portable electronic products due to its data non-volatility, low power consumption, small volume, and non-mechanical structure. For example, a solid state drive (SSD) is a storage device that uses a NAND flash memory as its storage medium, and which has been broadly used in notebook computers as the main storage device.

Generally speaking, when a host system is about to read data stored in a flash memory storage device, a control circuit of the flash memory storage device reads the corresponding data from a flash memory chip of the flash memory storage device according to a host read command received from the host system through a flash memory interface. After that, the control circuit transfers the data to the host system through a connector of the flash memory storage device. Herein the process for reading the data from the flash memory chip is referred to as internal data transfer, and the process for transferring the data to the host system is referred to as external data transfer.

The data transfer rates of connectors have been greatly increased along with the development of data transfer techniques. For example, a serial advanced technology attachment (SATA) connector offers a data transfer rate up to 15 gigabits (Gb) per second or even 30 Gb per second. However, if the internal data transfer rate is lower than the data transfer data of the connector, the efficiency of the entire storage system cannot be effectively improved. Thereby, how to shorten the time for executing host read commands has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data read method and a flash memory controller and a flash memory storage device using the same, wherein the time for executing a plurality of host read commands from a host system can be effectively shortened.

According to an exemplary embodiment of the present invention, a data read method is provided. The data read method is suitable for processing a plurality of host read commands from a host system by using a flash memory controller so as to read data corresponding to the host read commands from a plurality of flash memory modules, wherein the flash memory controller is coupled to the flash memory modules respectively through a plurality of data input/output buses, and each of the flash memory modules has a plurality of physical blocks. The data read method includes configuring a plurality of logical blocks, wherein the logical blocks are mapped to a part of the physical blocks in the flash memory modules. The data read method also includes receiving command queuing information related to the host read commands from the host system, wherein each of the host read commands is corresponding to one of the logical blocks, and each of the logical blocks is corresponding to one of the data input/output buses. The data read method further includes re-arranging the host read commands and generating a command giving sequence according to the data input/output buses corresponding to the host read commands and sending the command giving sequence to the host system. The data read method still includes sequentially receiving the host read commands from the host system according to the command giving sequence and reading the data corresponding to the host read commands from the flash memory modules according to the host read commands.

According to an exemplary embodiment of the present invention, a flash memory controller is provided. The flash memory controller processes a plurality of host read commands from a host system so as to read data corresponding to the host read commands from a plurality of flash memory modules, wherein each of the flash memory modules has a plurality of physical blocks. The flash memory controller includes a microprocessor unit, a flash memory interface unit, a host interface unit, and a memory management unit. The flash memory interface unit is coupled to the microprocessor unit and configured to couple to the flash memory modules through a plurality of data input/output buses. The host interface unit is coupled to the microprocessor unit and configured to couple to the host system. The memory management unit is coupled to the microprocessor unit and configures a plurality of logical blocks, wherein the logical blocks are mapped to a part of the physical blocks in the flash memory modules. The memory management unit receives command queuing information related to the host read commands from the host system through the host interface unit, wherein each of the host read commands is corresponding to one of the logical blocks, and each of the logical blocks is corresponding to one of the data input/output buses. The memory management unit re-arranges the host read commands and generates a command giving sequence according to the data input/output buses corresponding to the host read commands, and the memory management unit sends the command giving sequence to the host system. Besides, the memory management unit sequentially receives the host read commands from the host system through the host interface unit according to the command giving sequence and reads the data corresponding to the host read commands from the flash memory modules through the flash memory interface unit according to the host read commands.

According to an exemplary embodiment of the present invention, a flash memory storage system including a flash memory chip, a flash memory controller, and a connector is provided. The flash memory chip has a plurality of flash memory modules, and each of the flash memory modules has a plurality of physical blocks. The flash memory controller is coupled to the flash memory modules through a plurality of data input/output buses and configures a plurality of logical blocks, wherein the logical blocks are mapped to a part of the physical blocks in the flash memory modules. The connector is coupled to the flash memory controller and configured to couple to a host system. The flash memory controller receives command queuing information related to a plurality of host read commands from the host system through the connector, wherein each of the host read commands is corresponding to one of the logical blocks, and each of the logical blocks is corresponding to one of the data input/output buses. Besides, the flash memory controller re-arranges the host read commands and generates a command giving sequence according to the data input/output buses corresponding to the host read commands and sends the command giving sequence to the host system. In addition, the flash memory controller sequentially receives the host read commands from the host system through the connector according to the command giving sequence and reads data corresponding to the host read commands from the flash memory modules through the data input/output buses according to the host read commands.

As described above, in exemplary embodiments of the present invention, the time for executing a plurality of host read commands is greatly shortened so that the efficiency of a flash memory storage device is effectively improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
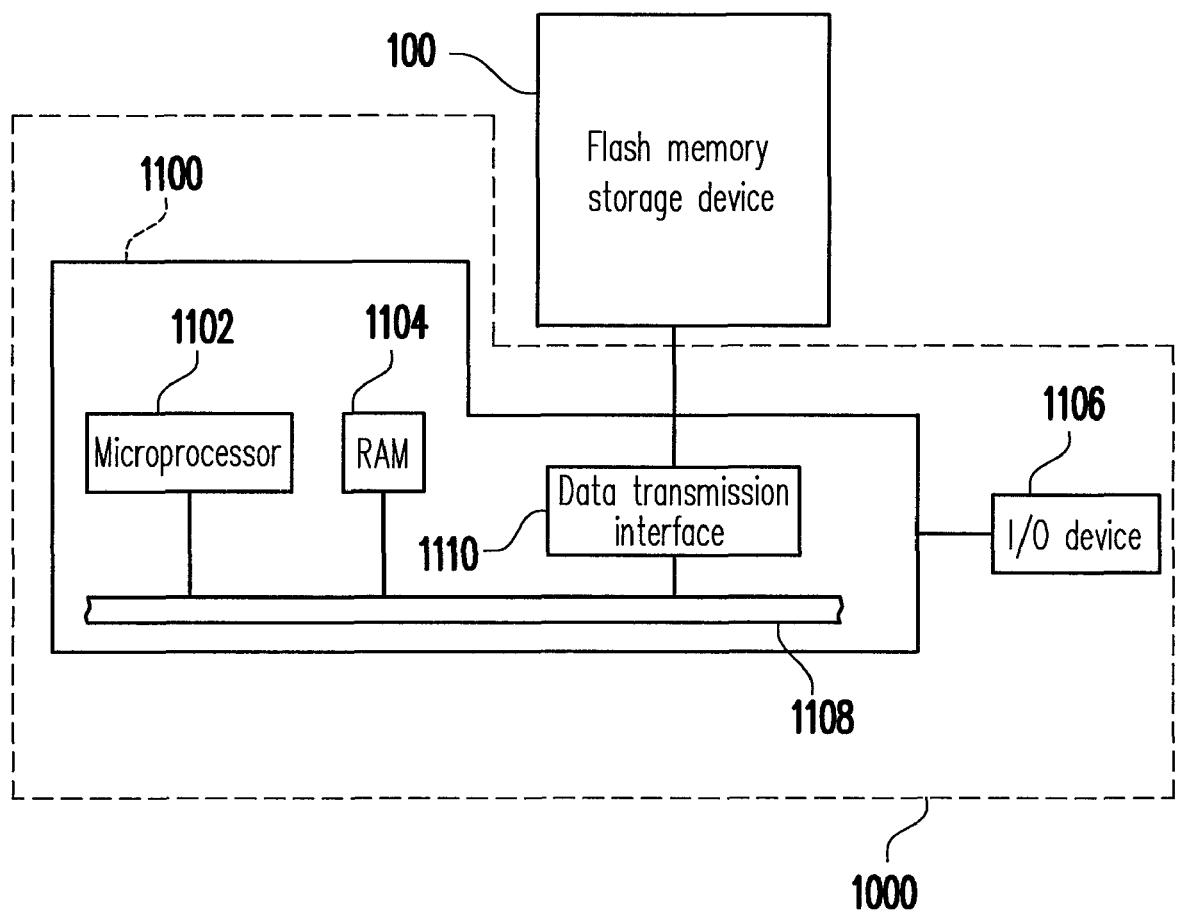
FIG. 1A illustrates a host system using a flash memory storage device according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a flash memory storage device includes a flash memory chip and a controller (also referred to as a control circuit). The flash memory storage device is usually used together with a host system so as to allow the host system to write data into or read data from the flash memory storage device. In addition, a flash memory storage device may also include an embedded flash memory and a software that can be executed in the host system be serve as a controller of the embedded flash memory.

First Exemplary Embodiment

FIG. 1A illustrates a host system using a flash memory storage device according to the first exemplary embodiment of the present invention.

Figure 1B:
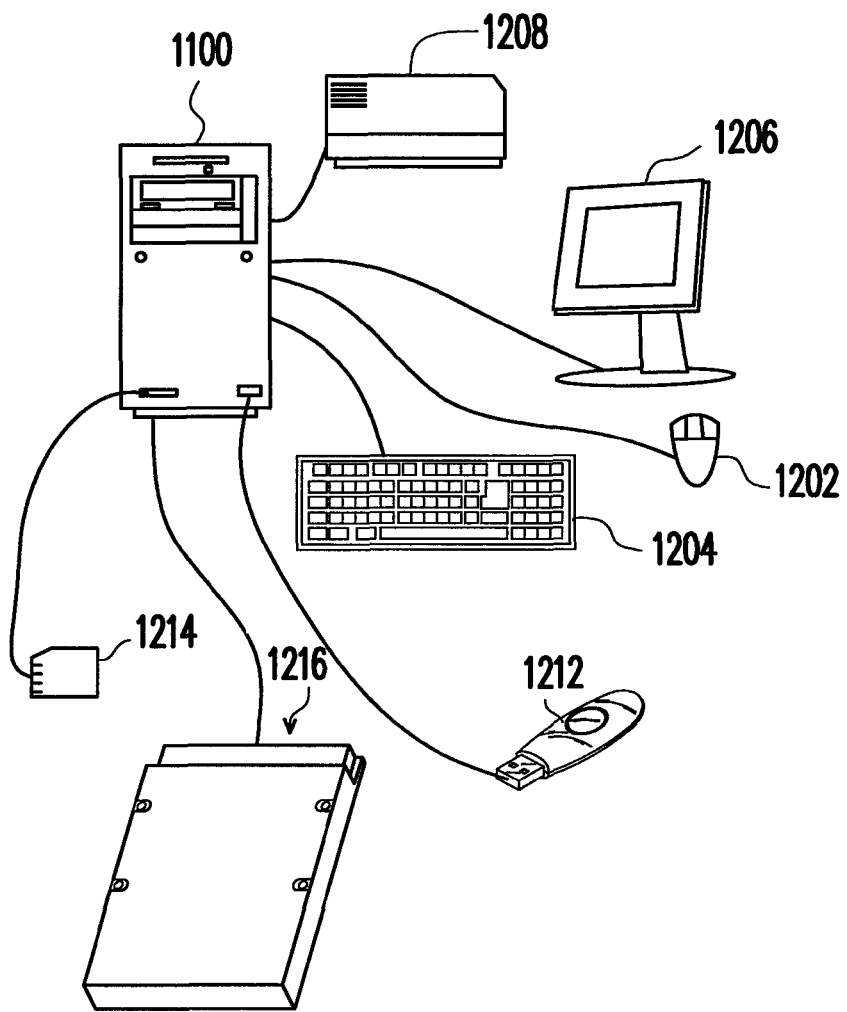
FIG. 1B is a diagram of a computer, an input/output (I/O) device, and a flash memory storage device according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, it should be understood that the devices illustrated in FIG. 1B are not intended to limit the I/O device 1106, and the I/O device 1106 may further include other devices.

In the present embodiment, the flash memory storage device 100 is coupled to other devices of the host system 1000 through the data transmission interface 1110. The host system 1000 writes data into or reads data from the flash memory storage device 100 through processing of the microprocessor

1102, the RAM 1104, and the I/O device 1106. For example, the flash memory storage device 100 may be a flash drive 1212, a memory card 1214, or a solid state drive (SSD) 1216, as shown in FIG. 1B.

Figure 1C:
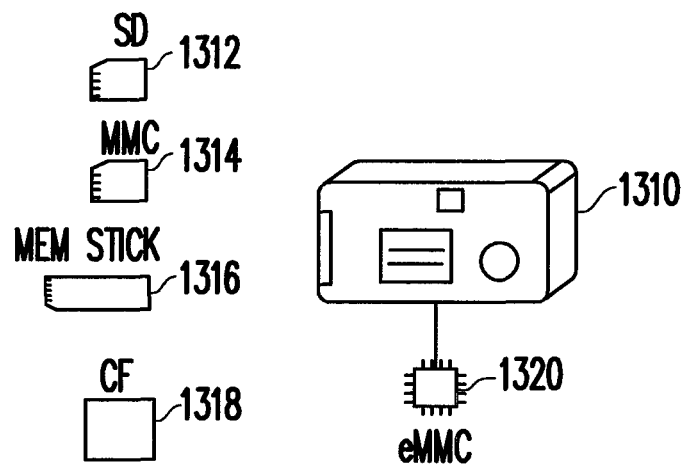
FIG. 1C is a diagram of a host system and a flash memory storage device according to another exemplary embodiment of the present invention.

Generally speaking, the host system 1000 is substantially any system that can store data. Even though the host system 1000 is described as a computer system in the present exemplary embodiment, in another exemplary embodiment of the present invention, the host system 1000 may also be a digital camera, a video camera, a communication device, an audio player, or a video player. For example, if the host system is a digital camera 1310, the flash memory storage device is then a secure digital (SD) card 1312, a multimedia card (MMC) card 1314, a memory stick 1316, a compact flash (CF) card 1318, or an embedded storage device 1320 (as shown in FIG. 1C) used in the digital camera 1310, wherein the embedded storage device 1320 may be an embedded MMC (eMMC). It should be mentioned that the embedded MMC is directly coupled onto a substrate of the host system 1000.

Figure 1D:
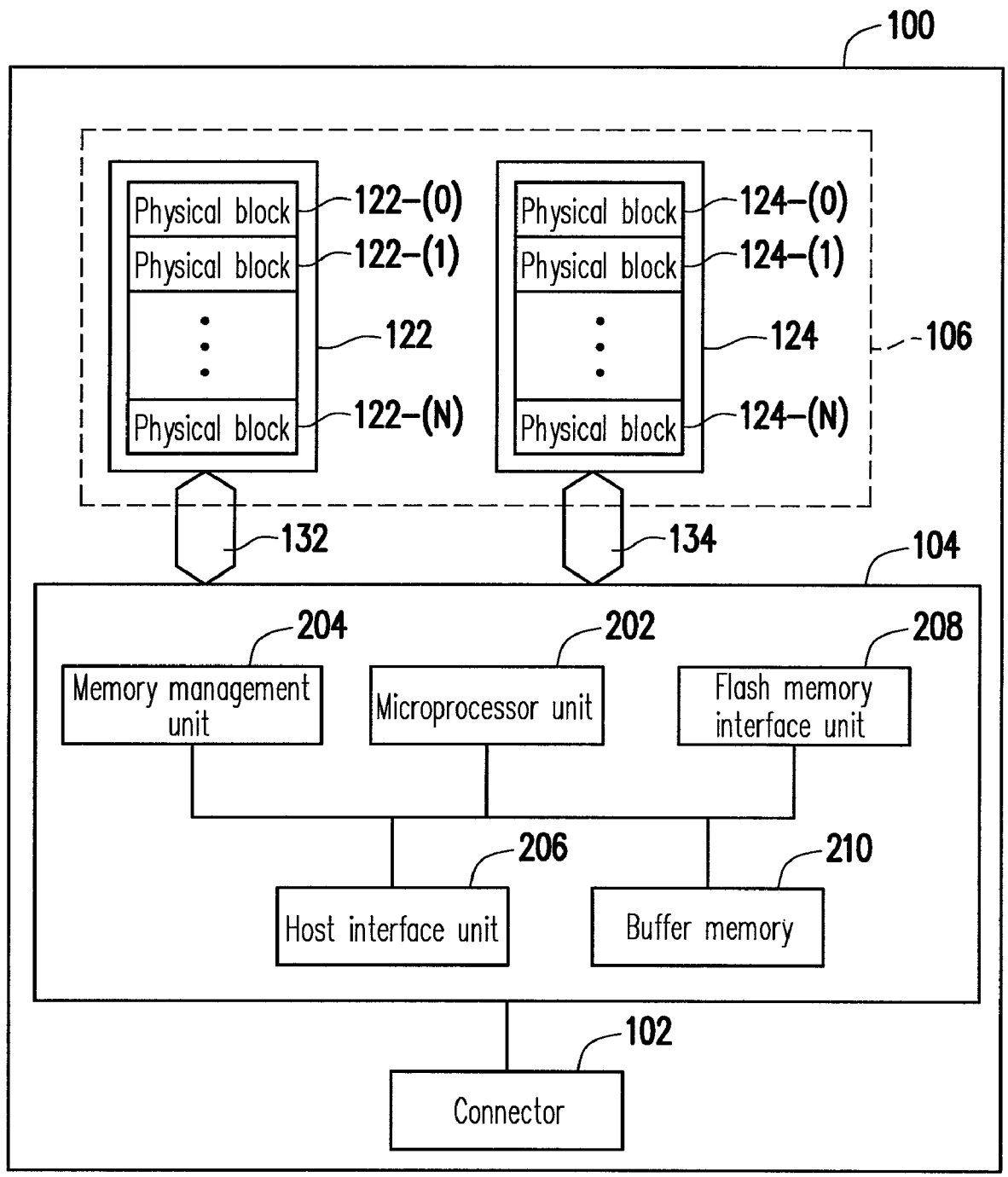
FIG. 1D is a schematic block diagram of the flash memory storage device in FIG. 1A.

FIG. 1D is a schematic block diagram of the flash memory storage device 100 in FIG. 1A.

Referring to FIG. 1D, the flash memory storage device 100 includes a connector 102, a flash memory controller 104, and a flash memory chip 106.

The connector 102 is coupled to the flash memory controller 104 and configured to couple to the host system 1000. In the present exemplary embodiment, the connector 102 is a serial advanced technology attachment (SATA) connector. However, the present invention is not limited thereto, and in another exemplary embodiment of the present invention, the connector 102 may also be other suitable connectors.

The flash memory controller 104 executes a plurality of logic gate or control instructions implemented in a hardware or firmware form and performs various data operations to the flash memory chip 106 according to instructions of the host system 1000. The flash memory controller 104 includes a microprocessor unit 202, a memory management unit 204, a host interface unit 206, a flash memory interface unit 208, and a buffer memory 210.

The microprocessor unit 202 is the main control unit of the flash memory controller 104, and which cooperates with the memory management unit 204, the host interface unit 206, the flash memory interface unit 208, and the buffer memory 210 to carry out various operations of the flash memory storage device 100.

The memory management unit 204 is coupled to the microprocessor unit 202, and which executes a data read mechanism and a block management mechanism according to exemplary embodiments of the present invention. Below, the operation of the memory management unit 204 will be described in detail with reference to accompanying drawings.

In the present exemplary embodiment, the memory management unit 204 is implemented in the flash memory controller 104 as a firmware form. For example, the memory management unit 204 including a plurality of control instructions is burned into a program memory (for example, a read only memory (ROM)) and the program memory is embedded into the flash memory controller 104. When the flash memory storage device 100 is in operation, the control instructions of the memory management unit 204 are executed by the microprocessor unit 202 to accomplish the data read mechanism and the block management mechanism according to exemplary embodiments of the present invention.

In another exemplary embodiment of the present invention, the control instructions of the memory management unit 204 may also be stored in a specific area (for example, a system area in the flash memory chip 106 for exclusively storing system data) of the flash memory chip 106 as program codes. Similarly, the control instructions of the memory management unit 204 are executed by the microprocessor unit 202 when the flash memory storage device 100 is in operation. In addition, in another exemplary embodiment of the present invention, the memory management unit 204 may also be implemented in the flash memory controller 104 in a hardware form.

The host interface unit 206 is coupled to the microprocessor unit 202 for receiving and identifying commands and data received from the host system 1000. Namely, commands and data received from the host system 1000 are sent to the microprocessor unit 202 through the host interface unit 206. In the present exemplary embodiment, the host interface unit 206 is a SATA interface corresponding to the connector 102. However, the present invention is not limited thereto, and the host interface unit 206 may also be other suitable data transmission interfaces.

The flash memory interface unit 208 is coupled to the microprocessor unit 202 and configured to access the flash memory chip 106. Namely, data to be written into the flash memory chip 106 is converted by the flash memory interface unit 208 into a format acceptable to the flash memory chip 106.

The buffer memory 210 is coupled to the microprocessor unit 202 for temporarily storing data and commands received from the host system 1000 or data received from the flash memory chip 106. It should be mentioned that in the present exemplary embodiment, the buffer memory 210 is configured in the flash memory controller 104. However, the present invention is not limited thereto, and the buffer memory 210 may not be configured in the flash memory controller 104.

Figure 2:
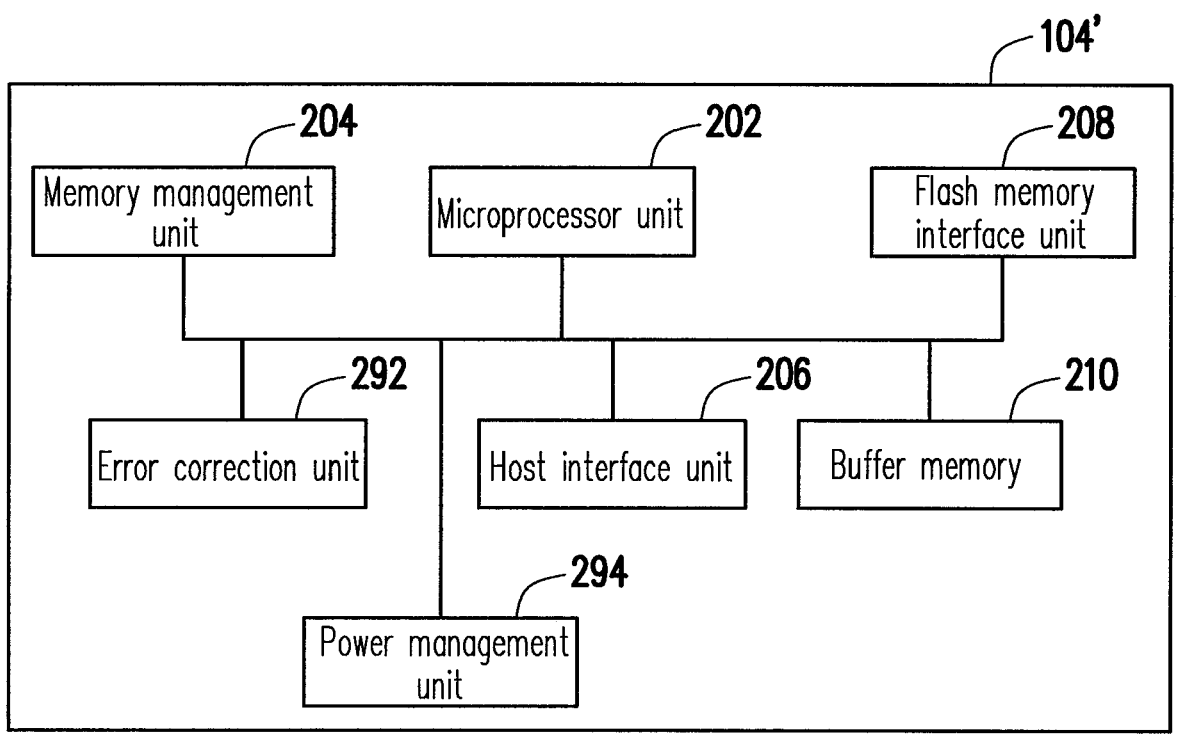
FIG. 2 is a schematic block diagram of a flash memory controller according to another exemplary embodiment of the present invention.

In another exemplary embodiment of the present invention, the flash memory controller may also include other functional modules. FIG. 2 is a schematic block diagram of a flash memory controller according to another exemplary embodiment of the present invention.

Referring to FIG. 2, besides the microprocessor unit 202, the memory management unit 204, the host interface unit 206, the flash memory interface unit 208, and the buffer memory 210, the flash memory controller 104' further includes an error correction unit 292 and a power management unit 294.

The error correction unit 292 is coupled to the microprocessor unit 202, and configured to execute an error correction process to ensure the accuracy of data. To be specific, when the host interface unit 206 receives a host write command from the host system 1000, the error correction unit 292 generates an error checking and correcting (ECC) code corresponding to the data to be written by the host write command, and the memory management unit 204 writes the data and the corresponding ECC code into the flash memory chip 106. When the host interface unit 206 receives a host read command from the host system 1000, the memory management unit 204 reads the data and the ECC code corresponding to the host read command from the flash memory chip 106, and the error correction unit 292 corrects the data according to the ECC code.

The power management unit 294 is coupled to the microprocessor unit 202 for controlling the power supply of the flash memory storage device 100.

The flash memory chip 106 is coupled to the flash memory controller 104 for storing data. The flash memory chip 106 includes a $0^{th}$ flash memory module 122 and a $1^{st}$ flash memory module 124. The $0^{th}$ flash memory module 122 has physical blocks 122-(0)~122-(N), and the $1^{st}$ flash memory module 124 has physical blocks 124-(0)~124-(N). Physical block is the smallest erasing unit. Namely, each physical block contains the least number of memory cells that are erased together. Each physical block has several physical pages. In the present exemplary embodiment, physical page is the smallest programming unit. In other words, physical page is the smallest unit for writing or reading data. Each physical page usually includes a user data area and a redundant area, wherein the user data area is configured to store user data, and the redundant area is configured to store system data (for example, an ECC code). In the present exemplary embodiment, the $0^{th}$ flash memory module 122 and the $1^{st}$ flash memory module 124 are multi level cell (MLC) NAND flash memory modules. However, the present invention is not limited thereto, and the $0^{th}$ flash memory module 122 and the $1^{st}$ flash memory module 124 may also be single level cell (SLC) NAND flash memory modules.

It should be mentioned that because the memory cells in a flash memory can only be programmed from "1" to "0", data in a physical block has to be erased before the physical block is updated. However, since data is written into a flash memory in unit of physical pages and erased in unit of physical blocks, in the present exemplary embodiment, the physical blocks are alternatively used for storing data.

Figure 3A:
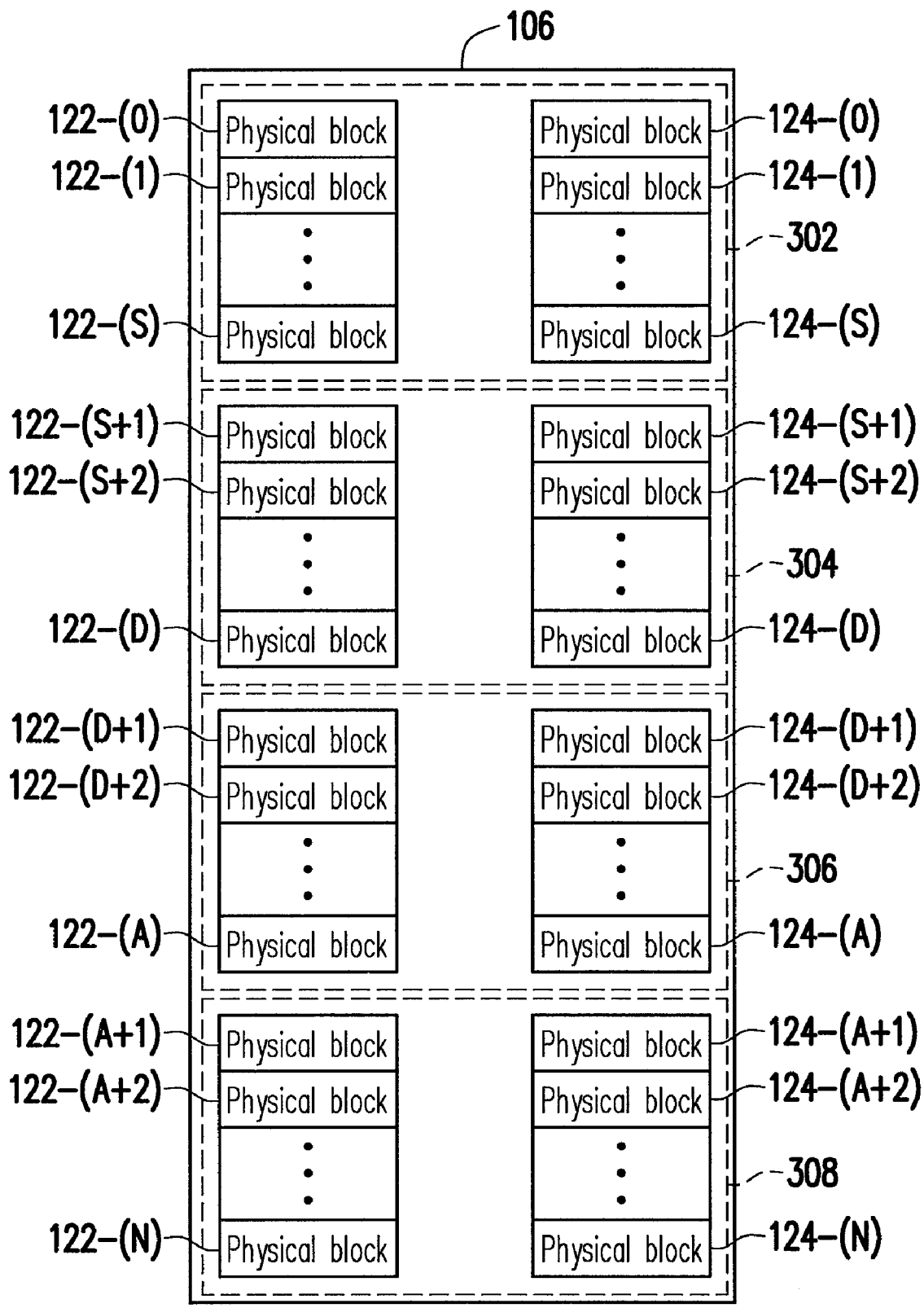
FIG. 3A is a block diagram of a flash memory chip according to the first exemplary embodiment of the present invention.

FIG. 3A is a block diagram of a flash memory chip according to the first exemplary embodiment of the present invention. It should be understood that the terms like "select", "substitute", "group", "alternate" used for describing the operations performed on the physical blocks of a flash memory only refer to logical operations performed on these physical blocks. Namely, the actual positions of the physical blocks in a flash memory are not changed. Instead, these physical blocks in the flash memory are only logically operated.

Referring to FIG. 3A, the memory management unit 204 logically groups the physical blocks 122-(0)~122-(N) and the physical blocks 124-(0)~124-(N) into a system area 302, a data area 304, a spare area 306, and a replacement area 308.

The physical blocks 122-(0)~122-(S) and the physical blocks 124-(0)~124-(S) logically belonging to the system area 302 are used to record system data provided to the flash memory controller 104, wherein the system data includes the manufacturer and model of the flash memory chip, the number of zones in each flash memory module, the number of physical blocks in each zone, and the number of physical pages in each physical block. Thus, the host system 1000 cannot access data in the physical blocks of the system area 302 in general access states.

The physical blocks 122-(S+1)~122-(D) and the physical blocks 124-(S+1)~124-(D) logically belonging to the data area 304 are used to store data written by the host system 1000. Generally speaking, the physical blocks in the data area 304 are mapped to those logical blocks accessed by the host system 1000. Namely, the physical blocks in the data area 304 are physical blocks used to store valid data.

The physical blocks 122-(D+1)~122-(A) and the physical blocks 124-(D+1)~124-(A) logically belonging to the spare area 306 are used to substitute the physical blocks in the data area 304. Thus, the physical blocks in the spare area 306 are blank or available units (i.e., no data is recorded in these physical blocks or data recorded in these physical blocks are marked as invalid data). In other words, the physical blocks in the data area 304 and the spare area 306 are alternatively used to store data written by the host system 1000 into the flash memory storage device 100.

The physical blocks 122-(A+1)~122-(N) and the physical blocks 124-(A+1)~124-(N) logically belonging to the replacement area 306 are replacement physical blocks. For example, when the flash memory chip 106 is manufactured, 4% of its physical blocks are reserved for replacement purpose. Namely, when a physical block in the system area 302, the data area 304, or the spare area 306 is damaged, a physical block is selected from the replacement area 308 for replacing the damaged physical block (i.e., a bad block). Thereby, if there are still available physical blocks in the replacement area 308 and a physical block is damaged, the memory management unit 204 selects an available physical block from the replacement area 308 for replacing the damaged physical block. If there is no more available physical block in the replacement area 308 and a physical block is damaged, the flash memory storage device 100 is announced as being in a write protect status and no data can be written into it. Thereby, the host system 1000 cannot access data in the physical blocks of the replacement area 308 in general access states.

It should be understood that the group relationship of the physical blocks 122-(0)~122-(N) and the physical blocks 124-(0)~124-(N) are grouped into the system area 302, the data area 304, the spare area 306, and the replacement area 308 dynamically changes along with the operation of the flash memory storage device 100. Namely, when the memory management unit 204 writes data into a physical block (for example, the physical block 122-(D+1)) originally belonging to the spare area 306, the physical block is linked to the data area 304. Or, when a physical block in the data area 304 (or the spare area 306) is damaged and accordingly is replaced by a physical block in the replacement area 308, the physical block originally in the replacement area 308 is then linked to the data area 304 (or the spare area 306).

For example, when the flash memory storage device 100 receives a host write command from the host system 1000 therefore is about to update (or write) data into a specific page of a specific physical block in the data area, the memory management unit 204 selects a physical block from the spare area and writes the old valid data in the physical block to be updated and the new data into the physical block selected from the spare area. Then, the memory management unit 204 links the physical block containing the old valid data and the new data to the data area, and erases the physical block to be updated in the data area and links it to the spare area.

In order to allow the host system 1000 to smoothly access the physical blocks alternatively used for storing data, the flash memory storage device 100 provides logical blocks to the host system 1000 and records the mapping relationships between the logical blocks and the physical blocks.

Figure 3B:
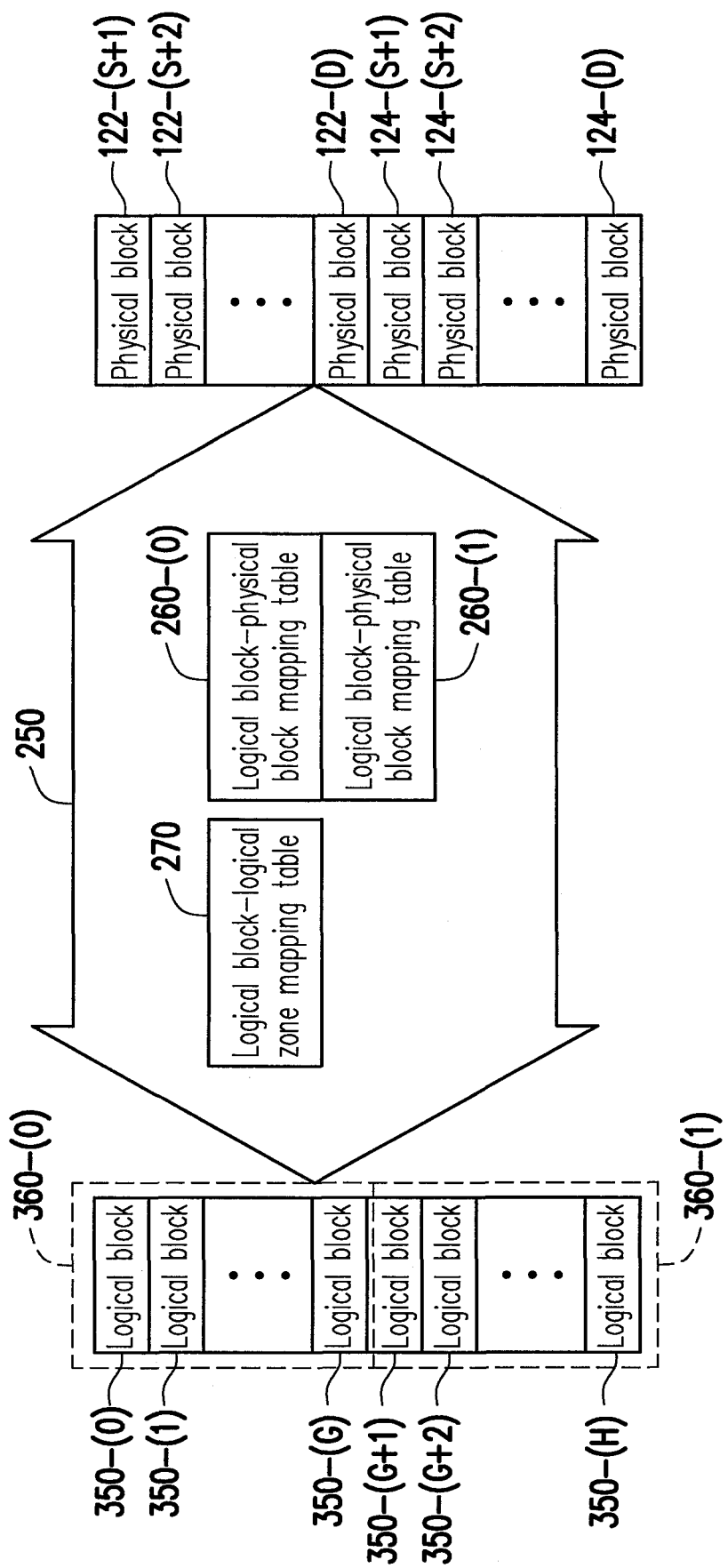
FIG. 3B illustrates how to record the mapping relationships between logical blocks and physical blocks according to the first exemplary embodiment of the present invention.

FIG. 3B illustrates how to record the mapping relationships between logical blocks and physical blocks according to the first exemplary embodiment of the present invention.

Referring to FIG. 3B, the flash memory controller 104 configures logical blocks 350-(0)~350-(H) to be accessed by the host system 1000, and the flash memory controller 104 provides a conversion layer 250 for mapping the logical blocks 350-(0)~350-(H) to the physical blocks 122-(S+1)~122-(D) and the physical blocks 124-(S+1)~124-(D) in the data area 304 of the flash memory chip 106. It has to be understood that as described above, the group relationship of the physical blocks 122-(0)~122-(N) and the physical blocks 124-(0)~124-(N) are grouped into the system area 302, the data area 304, the spare area 306, and the replacement area 308 dynamically changes along with the operation of the flash memory storage device 100. Thus, the mapping relationships between the logical blocks 350-(0)~350-(H) and the physical blocks 122-(S+1)~122-(D) and the physical blocks 124-(S+1)~124-(D) also dynamically changes. For example, assuming that the logical block 350-(0) is mapped to the physical block 122-(S+1) in the data area 304, if the host system 1000 is about to update the data in the physical block 122-(S+1), the memory management unit 204 selects the physical block 122-(D+1) from the spare area 306 and writes the data into the physical block 122-(D+1). After that, the memory management unit 204 links the physical block 122-(D+1) to the data area 304 and the physical block 122-(S+1) to the spare area 306. The logical block 350-(0) is then mapped to the physical block 122-(D+1).

In the present exemplary embodiment, the conversion layer 250 has a logical block-physical block mapping table for recording the physical blocks mapped to the logical blocks. Besides, the host system 1000 needs only to access data in the logical blocks 350-(0)~350-(H), and the flash memory controller 104 actually accesses the physical blocks according to the logical block-physical block mapping table. For example, each of the logical blocks 350-(0)~350-(H) includes a plurality of logical pages, and each of the logical pages is composed of a plurality of logical sectors, wherein the logical sectors are access units of the host system 1000. Thus, when the host system 1000 accesses data in the logical sectors, the flash memory controller 104 actually accesses the data in the physical blocks according to the logical blocks corresponding to the accessed logical sector.

In addition, it should be mentioned that the logical block-physical block mapping table is stored in the flash memory chip 106 (for example, in the system area), and when the flash memory storage device 100 is in operation, the logical block-physical block mapping table is loaded into the buffer memory 210 so that it can be read and updated by the memory management unit 204. However, with the limited storage space of the buffer memory 210, the logical block-physical block mapping table for recording the mapping relationships of all the logical blocks cannot be temporarily stored in the buffer memory 210. Thus, in the present exemplary embodiment, the memory management unit 204 groups the logical blocks 350-(0)~350-(H) into logical zones 360-(0) and 360-(1) and respectively configures a logical block-physical block mapping table 260-(0) and a logical block-physical block mapping table 260-(1) for the logical zones 360-(0) and 360-(1). To be specific, among the logical blocks 350-(0)~350-(H), the logical blocks 350-(0)~350-(G) are grouped into the logical zone 360-(0), and the logical blocks 350(G+1)~350-(H) are grouped into the logical zone 360-(1), wherein the mapping information of the logical blocks 350-(0)~350-(G) is recorded in the logical block-physical block mapping table 260-(0), and the mapping information of the logical blocks 350(G+1)~350-(H) is recorded in the logical block-physical block mapping table 260-(1). Namely, each logical block belongs to one of the logical zones, and the memory management unit 204 respectively records the mapping relationship of each logical block into the logical block-physical block mapping table in the corresponding logical zone. Accordingly, when the host system 1000 is about to access a specific logical block, the memory management unit 204 loads the corresponding logical block-physical block mapping table from the flash memory chip 106 according to the logical zone corresponding to the specific logical block into the buffer memory 210 and accesses data in the specific logical block according to the logical block-physical block mapping table. Subsequently, when the host system 1000 is about to access a logical block in another logical zone, the memory management unit 204 stores the current logical block-physical block mapping table back into the flash memory chip 106 and loads another corresponding logical block-physical block mapping table into the buffer memory 210. Thereby, the problem that the buffer memory 210 has no enough storage space for storing the mapping relationships of all the logical blocks can be resolved. It should be understood that even though the logical blocks are grouped into two logical zones in the present exemplary embodiment, the present invention is not limited thereto, and there may be any number of logical zones.

In order to identify the logical zone corresponding to each logical block, in the present exemplary embodiment, the conversion layer 250 includes a logical block-logical zone mapping table 270 for recording the mapping relationships between the logical blocks and the logical zones. For example, the logical block-logical zone mapping table 270 is stored in the flash memory chip 106 (for example, in a system area), and when the flash memory storage device 100 is in operation, the memory management unit 204 loads the logical block-logical zone mapping table 270 into the buffer memory 210 and loads the corresponding logical block-physical block mapping table according to the logical block-logical zone mapping table 270. In addition, when the flash memory storage device 100 is about to stop its operation, the memory management unit 204 stores the logical block-logical zone mapping table 270 back into the flash memory chip 106. It should be mentioned that in the present exemplary embodiment, the memory management unit 204 records the mapping relationships between the logical blocks and the logical zones by maintaining the logical block-logical zone mapping table 270. However, in another exemplary embodiment of the present invention, the memory management unit 204 may also determine the logical zone corresponding to each logical block by using a mathematical expression or record the logical zone corresponding to each logical block in the logical block-physical block mapping table.

In the present exemplary embodiment, a $0^{th}$ data input/output bus 132 is disposed between the $0^{th}$ flash memory module 122 and the flash memory controller 104, and a $1^{st}$ data input/output bus 134 is disposed between the $1^{st}$ flash memory module 124 and the flash memory controller 104. Namely, the flash memory controller 104 accesses the physical blocks 122-(0)~122-(N) through the $0^{th}$ data input/output bus 132 and accesses the physical blocks 124-(0)~124-(N) through the $1^{st}$ data input/output bus 134. In particular, the $0^{th}$ data input/output bus 132 and the $1^{st}$ data input/output bus 134 are independent from each other, so that the flash memory controller 104 can simultaneously access the $0^{th}$ flash memory module 122 and the $1^{st}$ flash memory module 124 through the $0^{th}$ data input/output bus 132 and the $1^{st}$ data input/output bus 134.

For example, assuming that the host system 1000 is about to access data in the logical block 350-(0) and the logical block 350-(0) is currently mapped to the physical block 122-(S+1), when the memory management unit 204 receives a host read command from the host system 1000, the memory management unit 204 determines that the host read command is corresponding to the logical block 350-(0) according to information in the host read command and identifies that the logical block 350-(0) is mapped to the physical block 122-(S+1) according to the logical block-physical block mapping table (for example, the logical block-physical block mapping table 260-0) in the logical zone corresponding to the logical block 350-(0). Besides, since the physical block 122-(S+1) belongs to the $0^{th}$ flash memory module 122, the memory management unit 204 determines that the host read command is corresponding to the $0^{th}$ data input/output bus 132. Namely, the memory management unit 204 reads the data to be read by the host read command through the $0^{th}$ data input/output bus 132.

It should be mentioned that in the present exemplary embodiment, when the host system 1000 is about to sends a plurality of host read commands, the host system 1000 first sends command queuing information related to these host read commands. The memory management unit 204 re-arranges these host read commands through the command queuing information to generate a command giving sequence according to the logical blocks and the data input/output buses corresponding to all the host read commands and sends the generated command giving sequence back to the host system 1000. Then, the host system 1000 sends these host read commands according to the received command giving sequence.

For example, the host system 1000 sends the command queuing information related to a plurality of host read commands by using a native command queuing (NCQ) protocol. In this case, the connector 102 and the host interface unit 206 support the NCQ protocol, and the host read commands are transmitted from the host system 1000 to the flash memory controller 104 through the connector 102 and the host interface unit 206 by using the NCQ protocol.

Particularly, in the present exemplary embodiment, the memory management unit 204 simultaneously reads data corresponding to two host read commands through the $0^{th}$ data input/output bus 132 and the $1^{st}$ data input/output bus 134 according to the command giving sequence. Below, how the memory management unit 204 re-arranges the host read commands according to the data input/output buses corresponding to the host read commands and simultaneously reads the data corresponding to two host read commands will be described in detail with reference to a data read example.

Figure 4:
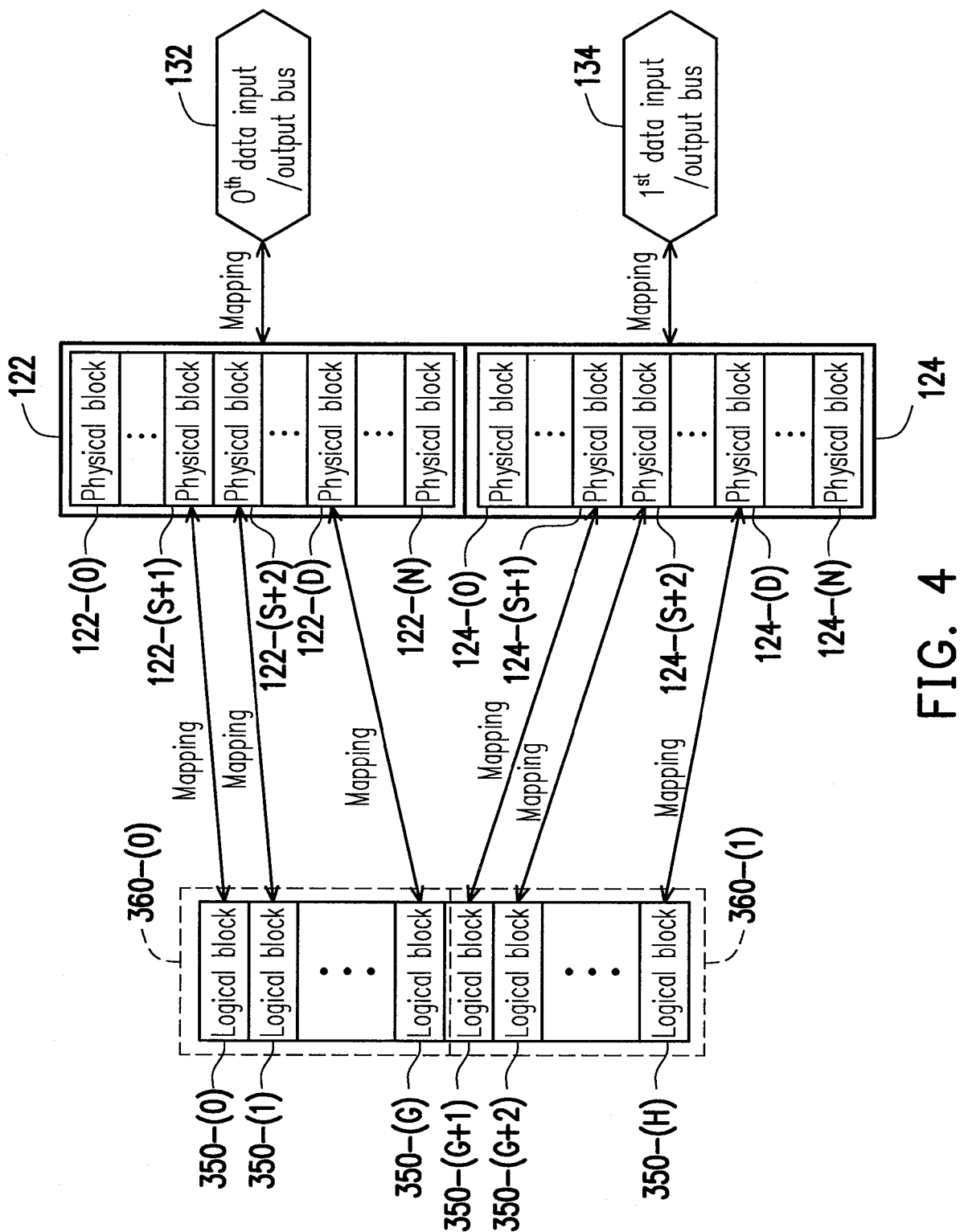
FIG. 4 illustrates an example of the mapping relationships between logical blocks and physical blocks according to the first exemplary embodiment of the present invention.

In the present data read example, the host system 1000 sends command queuing information to the flash memory storage device 100, wherein the command queuing information indicates that the host system 1000 is about to send a plurality of host read commands including a $1^{st}$ host read command CM1 for reading data in the logical block 350-(0), a $2^{nd}$ host read command CM2 for reading data in the logical block 350-(1), a $3^{rd}$ host read command CM3 for reading data in the logical block 350-(G+1), and a $4^{th}$ host read command CM4 for reading data in the logical block 350-(G+2). Herein it is assumed that the logical block 350-(0) is mapped to the physical block 122-(S+1), the logical block 350-(1) is mapped to the physical block 122-(S+2), the logical block 350-(G+1) is mapped to the physical block 124-(S+1), and the logical block 350-(G+2) is mapped to the physical block 124-(S+2) (as shown in FIG. 4).

Figure 5A:
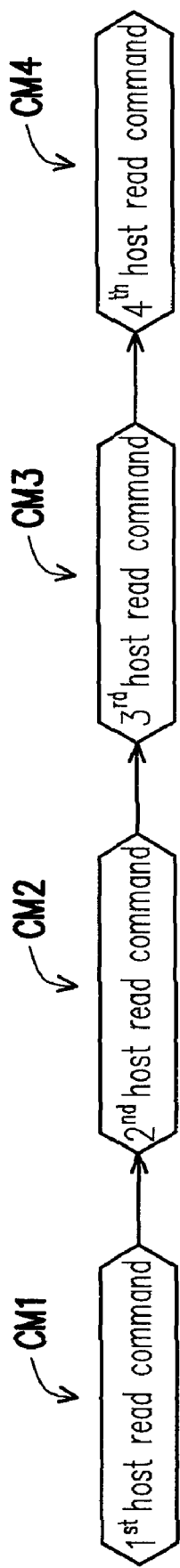
FIG. 5A and FIG. 5B illustrate an example of how a memory management unit re-arranges host read commands and generates a command giving sequence according to the first exemplary embodiment of the present invention.
Figure 5B:
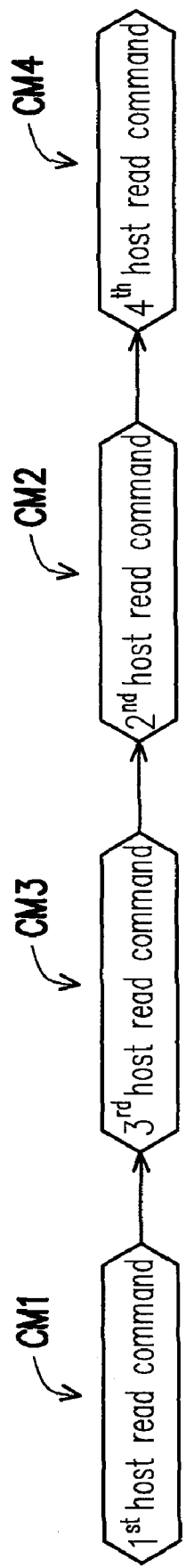

FIG. 5A and FIG. 5B illustrate an example of how a memory management unit re-arranges host read commands and generates a command giving sequence according to the first exemplary embodiment of the present invention.

When the flash memory controller 104 receives command queuing information indicating the sequence of the host read commands as the $1^{st}$ host read command CM1, the $2^{nd}$ host read command CM2, the $3^{rd}$ host read command CM3, and the $4^{th}$ host read command CM4 (as shown in FIG. 5A) through the connector 102, the memory management unit 204 identifies that the $1^{st}$ host read command CM1 is corresponding to the $0^{th}$ data input/output bus 132, the $2^{nd}$ host read command CM2 is corresponding to the $0^{th}$ data input/output bus 132, the $3^{rd}$ host read command CM3 is corresponding to the $1^{st}$ data input/output bus 134, and the $4^{th}$ host read command CM4 is corresponding to the $1^{st}$ data input/output bus 134 according to the logical blocks corresponding to the host read commands in the command queuing information and information recorded in the conversion layer 250 (for example, a logical block-physical block mapping table). Namely, the memory management unit 204 needs to read the data to be read by the $1^{st}$ host read command CM1 and the $2^{nd}$ host read command CM2 through the $0^{th}$ data input/output bus 132 and the data to be read by the $3^{rd}$ host read command CM3 and the $4^{th}$ host read command CM4 through the $1^{st}$ data input/output bus 134.

As described above, because the flash memory controller 104 can simultaneously access the $0^{th}$ flash memory module 122 and the $1^{st}$ flash memory module 124 through the $0^{th}$ data input/output bus 132 and the $1^{st}$ data input/output bus 134, the memory management unit 204 arranges the host read commands corresponding to different data input/output buses in sequence. Thereby, the time for executing the host read commands can be shortened by simultaneously reading data through different data input/output buses.

For example, as shown in FIG. 5B, in the present data read example, the memory management unit 204 generates a command giving sequence in the sequence of the $1^{st}$ host read command CM1, the $3^{rd}$ host read command CM3, the $2^{nd}$ host read command CM2, and the $4^{th}$ host read command CM4 and sends the generated command giving sequence to the host system 1000, wherein the data corresponding to the $1^{st}$ host read command CM1 and the $3^{rd}$ host read command CM3 is simultaneously read from the flash memory chip 106, and the data corresponding to the $2^{nd}$ host read command CM2 and the $4^{th}$ host read command CM4 is simultaneously read from the flash memory chip 106.

After that, when the host system 1000 receives the command giving sequence, the host system 1000 first sends the $1^{st}$ host read command CM1, and the memory management unit 204 then processes the $1^{st}$ host read command CM1 to read data from the physical block 122-(S+1) according to the corresponding logical block 350-(0) through the $0^{th}$ data input/output bus 132. In particular, at the same time when the memory management unit 204 processes the $1^{st}$ host read command CM1, the memory management unit 204 reads the data to be read by the $3^{rd}$ host read command CM3 (i.e., data stored in the physical block 124-(S+1) corresponding to the logical block 350-(G+1)) through the $1^{st}$ data input/output bus 134. To be specific, even though the host system 1000 only sends the $1^{st}$ host read command CM1, the memory management unit 204 already gets to know that the next command is the $3^{rd}$ host read command CM3 according to the command giving sequence and the $1^{st}$ data input/output bus 134 is in an idle status. Thus, the memory management unit 204 simultaneously reads the data corresponding to the $3^{rd}$ host read command CM3 while it processes the $1^{st}$ host read command CM1.

After the memory management unit 204 transfers the data corresponding to the $1^{st}$ host read command CM1 to the host system 1000, the host system 1000 sends the next command (i.e., the $3^{rd}$ host read command CM3). Herein the memory management unit 204 does not need to read the data from the flash memory chip 106 but directly transfers the data corresponding to the $3^{rd}$ host read command CM3 to the host system 1000.

Next, after the host system 1000 receives the data corresponding to the $3^{rd}$ host read command CM3, the host system 1000 sends the next command (i.e., the $2^{nd}$ host read command CM2), and the memory management unit 204 then processes the $2^{nd}$ host read command CM2 to read data from the physical block 122-(S+2) according to the corresponding logical block 350-(1) through the $0^{th}$ data input/output bus 132. Similarly, at the same time when the memory management unit 204 processes the $2^{nd}$ host read command CM2, the memory management unit 204 reads the data to be read by the $4^{th}$ host read command CM4 (i.e., data in the physical block 124-(S+2) corresponding to the logical block 350-(G+2)) through the $1^{st}$ data input/output bus 134.

After the memory management unit 204 transfers the data corresponding to the 2$^{nd}$ host read command CM2 to the host system 1000, the host system 1000 sends the next command (i.e., the 4$^{th}$ host read command CM4). Herein the memory management unit 204 does not need to read the data from the flash memory chip 106 but directly transfers the data corresponding to the 4$^{th}$ host read command CM4 to the host system 1000.

In the present example, the memory management unit 204 re-arranges the host read commands and pre-reads the data corresponding to the 3$^{rd}$ host read command CM3 at the same time when it executes the 1$^{st}$ host read command CM1 and pre-reads the data corresponding to the 4$^{th}$ host read command CM4 at the same time when it executes the 2$^{nd}$ host read command CM2. For example, the memory management unit 204 pre-reads the data corresponding to a second (i.e., a subsequent) host read command (for example, the 3$^{rd}$ host read command CM3 and the 4$^{th}$ host read command CM4) when the memory management unit 204 processes a first (i.e., the current) host read command (for example, the 1$^{st}$ host read command CM1 and the 2$^{nd}$ host read command CM2) and temporarily stores the pre-read data into the buffer memory 210. Subsequently, when the second host read command is received, the memory management unit 204 directly transfers the corresponding data from the buffer memory 210 to the host system 1000. Thereby, the time for executing the host read commands can be greatly shortened.

Figure 6:
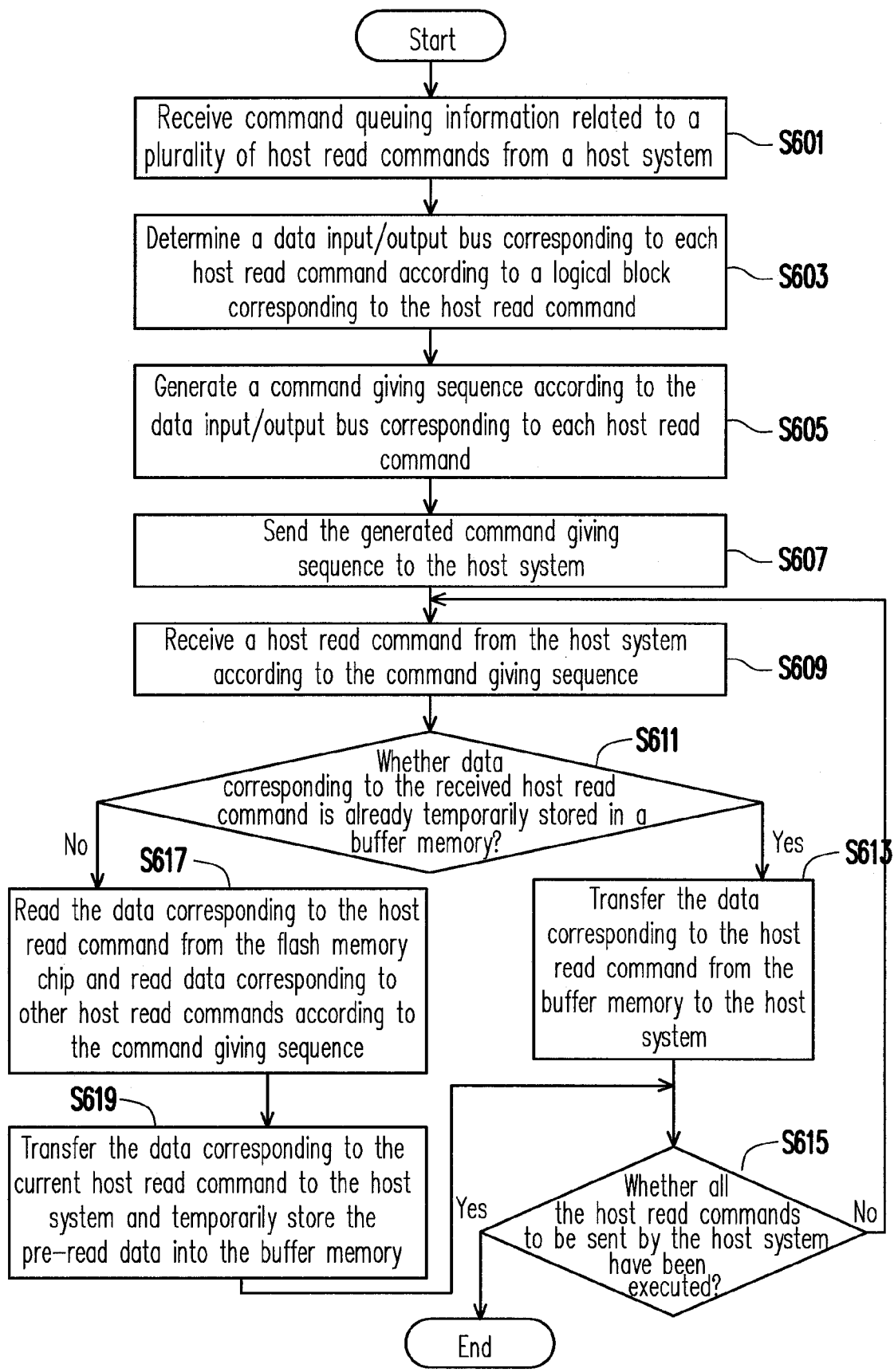
FIG. 6 is a flowchart of a data read method executed by a flash memory controller according to the first exemplary embodiment of the present invention.

FIG. 6 is a flowchart of a data read method executed by a flash memory controller according to the first exemplary embodiment of the present invention.

Referring to FIG. 6, first, in step S601, the flash memory controller 104 receives command queuing information related to a plurality of host read commands from the host system 1000. Then, in step S603, the flash memory controller 104 determines the data input/output bus corresponding to each host read command according to the logical block corresponding to each host read command. To be specific, in step S601, the flash memory controller 104 receives the command queuing information from the host system 1000 by using the NCQ protocol so as to obtain the command queuing information of the host read commands to be sent by the host system 1000. However, the present invention is not limited thereto, and in another exemplary embodiment of the present invention, the flash memory controller 104 may also receive the command queuing information related to the host read commands from the host system 1000 through other suitable methods.

In step S605, the flash memory controller 104 generates a command giving sequence according to the data input/output bus corresponding to each host read command, and in step S607, the flash memory controller 104 sends the generated command giving sequence to the host system 1000.

Next, in step S609, the flash memory controller 104 receives a host read command from the host system 1000 according to the command giving sequence, and in step S611, the flash memory controller 104 determines whether the data corresponding to the received host read command is already temporarily stored in the buffer memory 210.

If the data corresponding to the received host read command is already temporarily stored in the buffer memory 210, in step S613, the flash memory controller 104 transfers the data corresponding to the host read command from the buffer memory 210 to the host system 1000, and in step S615, the flash memory controller 104 determines whether all the host read commands to be sent by the host system 1000 have been executed. If all the host read commands have been executed, the procedure illustrated in FIG. 6 is ended. Otherwise, step S609 is executed to receive the next host read commands.

If the data corresponding to the received host read command is not temporarily stored in the buffer memory 210, in step S617, the flash memory controller 104 reads the data corresponding to the host read command from the flash memory chip 106 and at the same time, reads data corresponding to other host read commands according to the command giving sequence. To be specific, in step S617, the flash memory controller 104 pre-reads data corresponding to a second host read command according to the command giving sequence when it processes the first host read command, wherein the data input/output bus corresponding to the second host read command is different from the data input/output bus corresponding to the first host read command. Namely, the flash memory controller 104 pre-reads the data corresponding to the second host read command by using another idle data input/output bus when it processes the first host read command.

In step S619, the flash memory controller 104 transfers the data corresponding to the first host read command to the host system 1000 and temporarily stores the pre-read data into the buffer memory 210. After that, the flash memory controller 104 executes step S615.

Second Exemplary Embodiment

The flash memory storage device and the host system in the second exemplary embodiment of the present invention are substantially the same as those in the first exemplary embodiment of the present invention, and the difference is that in the second exemplary embodiment, the memory management unit re-arranges the host read commands to be sent by the host system through a different method. Below, the second exemplary embodiment will be described with reference to FIG. 1A, FIG. 1D, FIG. 3A, FIG. 3B, and FIG. 4 of the first exemplary embodiment.

In the first exemplary embodiment, the memory management unit 204 of the flash memory controller 104 receives the command queuing information related to the host read commands from the host system 1000 and generates a command giving sequence according to the data input/output buses corresponding to the host read commands, so that the time for executing the host read commands can be shortened by simultaneously reading data corresponding to a second host read command through a different data input/output bus. In the second exemplary embodiment of the present invention, besides generating the command giving sequence according to the data input/output buses corresponding to the host read commands, the memory management unit 204 further generates the command giving sequence according to the logical zones to which the logical blocks corresponding to the host read commands belong, so as to further shorten the time for executing the host read commands.

To be specific, as described above, the logical blocks 350-(0)~350-(H) are grouped into a logical zone 360-(0) and a logical zone 360-(1), and the memory management unit 204 configures a logical block-physical block mapping table for each of the logical zones. Thus, the memory management unit 204 needs to load the corresponding logical block-physical block mapping tables from the flash memory chip 106 when the host system 1000 accesses the logical blocks belonging to different logical zones. Thereby, when multiple host read commands are executed, the number of times for switching between different logical block-physical block mapping tables can be reduced and accordingly the time for executing the host read commands can be greatly shortened.

Below, how the memory management unit 204 re-arranges the host read commands according to the logical blocks, the data input/output buses, and the logical zones corresponding to these host read commands and simultaneously reads data corresponding to two host read commands in the second exemplary embodiment will be described in detail with reference to a data read example.

In the present data read example, the host system 1000 sends command queuing information to the flash memory storage device 100, wherein the command queuing information indicates that the host system 1000 is about to send a plurality of host read commands (including a $1^{st}$ host read command CM1 for reading data in the logical block 350-(0), a $2^{nd}$ host read command CM2 for reading data in the logical block 350-(1), a $3^{rd}$ host read command CM3 for reading data in the logical block 350-(G+1), and a $4^{th}$ host read command CM4 for reading data in the logical block 350-(G+2). Herein it is assumed that the logical block 350-(0) is mapped to the physical block 122-(S+1), the logical block 350-(1) is mapped to the physical block 122-(S+2), the logical block 350-(G+1) is mapped to the physical block 124-(S+1), and the logical block 350-(G+2) is mapped to the physical block 124-(S+2), wherein the logical block 350-(0) and the logical block 350-(1) belong to the logical zone 360-(0), and the logical block 350-(G+1) and the logical block 350-(G+2) belong to the logical zone 360-(1) (as shown in FIG. 4). In addition, it is assumed that the logical block-physical block mapping table currently loaded into the buffer memory 210 is the logical block-physical block mapping table 260-(1) corresponding to the logical zone 360-(1).

Figure 7A:
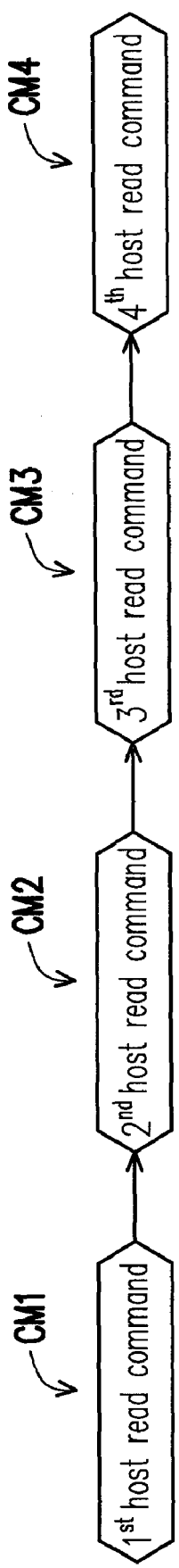
FIGS. 7A~7C illustrate an example of how a memory management unit re-arranges host read commands and generates a command giving sequence according to a second exemplary embodiment of the present invention.
Figure 7B:
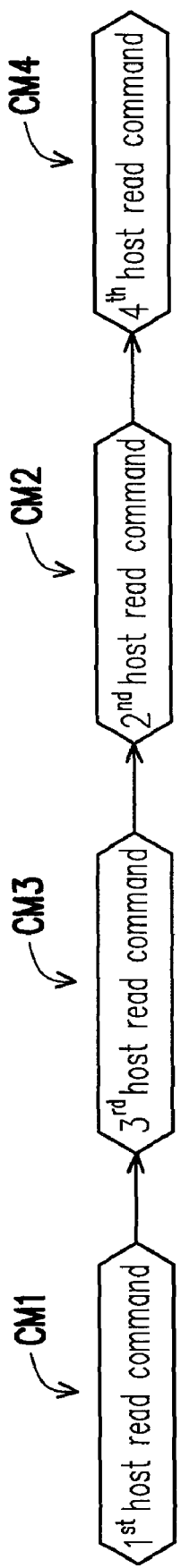
Figure 7C:
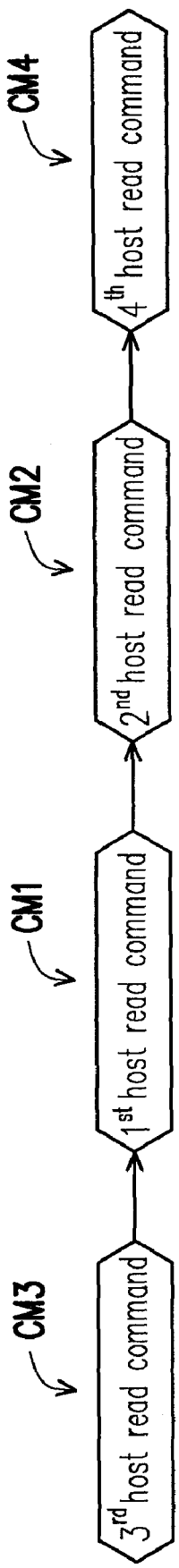

FIGS. 7A~7C illustrate an example of how a memory management unit re-arranges host read commands and generates a command giving sequence according to the second exemplary embodiment of the present invention.

When the flash memory controller 104 receives the command queuing information indicating the sequence of the host read commands as the $1^{st}$ host read command CM1, the $2^{nd}$ host read command CM2, the $3^{rd}$ host read command CM3, and the $4^{th}$ host read command CM4 (as shown in FIG. 7A), the memory management unit 204 identifies that the $1^{st}$ host read command CM1 is corresponding to the $0^{th}$ data input/output bus 132, the $2^{nd}$ host read command CM2 is corresponding to the $0^{th}$ data input/output bus 132, the $3^{rd}$ host read command CM3 is corresponding to the $1^{st}$ data input/output bus 134, and the $4^{th}$ host read command CM4 is corresponding to the $1^{st}$ data input/output bus 134 according to the logical blocks corresponding to the host read commands in the command queuing information and information recorded in the conversion layer 250 (for example, a logical block-physical block mapping table). Namely, the memory management unit 204 reads the data to be read by the $1^{st}$ host read command CM1 and the $2^{nd}$ host read command CM2 through the $0^{th}$ data input/output bus 132 and reads the data to be read by the $3^{rd}$ host read command CM3 and the $4^{th}$ host read command CM4 through the $1^{st}$ data input/output bus 134.

For example, as shown in FIG. 7B, the memory management unit 204 first arranges the host read commands to be sent by the host system 1000 in the sequence of the $1^{st}$ host read command CM1, the $3^{rd}$ host read command CM3, the $2^{nd}$ host read command CM2, and the $4^{th}$ host read command CM4 according to the data input/output buses corresponding to the host read commands, wherein the data corresponding to the $1^{st}$ host read command CM1 and the $3^{rd}$ host read command CM3 can be simultaneously read from the flash memory chip 106, and the data corresponding to the $2^{nd}$ host read command CM2 and the $4^{th}$ host read command CM4 can be simultaneously read from the flash memory chip 106.

Next, the memory management unit 204 adjusts the command giving sequence according to the logical block-physical block mapping table currently stored in the buffer memory. For example, if the logical block-physical block mapping table 260-(1) corresponding to the logical zone 360-(1) is currently stored in the buffer memory, the memory management unit 204 first processes the $3^{rd}$ host read command CM3 corresponding to the logical zone 360-(1) and then processes the $1^{st}$ host read command CM1. When the memory management unit 204 processes the $1^{st}$ host read command CM1, the logical block-physical block mapping table 260-(1) loaded in the buffer memory is switched to the logical block-physical block mapping table 260-(0) corresponding to the logical zone 360-(0). Thus, after the $1^{st}$ host read command CM1 is processed, the memory management unit 204 first processes the $2^{nd}$ host read command CM2 corresponding to the logical zone 360-(0) and then processes the $4^{th}$ host read command CM4. Accordingly, as shown in FIG. 7C, the memory management unit 204 generates the command giving sequence in the sequence of the $3^{rd}$ host read command CM3, the $1^{st}$ host read command CM1, the $2^{nd}$ host read command CM2, and the $4^{th}$ host read command CM4 and sends the generated command giving sequence to the host system 1000.

Thereafter, when the host system 1000 receives the command giving sequence, the host system 1000 first sends the $3^{rd}$ host read command CM3, and the memory management unit 204 processes the $3^{rd}$ host read command CM3 so as to read data from the physical block 124-(S+1) through the $1^{st}$ data input/output bus 134 according to the corresponding logical block 350-(G+1). At the same time when the memory management unit 204 processes the $3^{rd}$ host read command CM3, the memory management unit 204 reads the data to be read by the $1^{st}$ host read command CM1 (i.e., data stored in the physical block 122-(S+1) corresponding to the logical block 350-(0)) through the $0^{th}$ data input/output bus 132. To be specific, the memory management unit 204 first obtains the related mapping information according to the logical block-physical block mapping table 260-(1) loaded in the buffer memory 210 and then closes the logical block-physical block mapping table 260-(1) and loads the logical block-physical block mapping table 260-(0) to obtain the related mapping information.

Next, after the memory management unit 204 transfers the data corresponding to the $3^{rd}$ host read command CM3 to the host system 1000, the host system 1000 sends the next command (i.e., the $1^{st}$ host read command CM1). Then, the memory management unit 204 directly transfers the data corresponding to the $1^{st}$ host read command CM1 from the buffer memory 210 to the host system 1000 without reading the data from the flash memory chip 106.

After the host system 1000 receives the data corresponding to the $1^{st}$ host read command CM1, the host system 1000 sends the next command (i.e., the $2^{nd}$ host read command CM2), and the memory management unit 204 processes the $2^{nd}$ host read command CM2 to read data from the physical block 122-(S+2) through the $0^{th}$ data input/output bus 132 according to the corresponding logical block 350-(1). Similarly, at the same time when the memory management unit 204 processes the $2^{nd}$ host read command CM2, the memory management unit 204 reads the data to be read by the $4^{th}$ host read command CM4 (i.e., data stored in the physical block 124-(S+2) corresponding to the logical block 350-(G+2)) through the $1^{st}$ data input/output bus 134. To be specific, the memory management unit 204 first obtains the related mapping information according to the logical block-physical block mapping table 260-(0) loaded into the buffer memory 210, and then closes the logical block-physical block mapping table 260-(0) and loads the logical block-physical block mapping table 260-(1) to obtain the related mapping information.

Thereafter, after the memory management unit 204 transfers the data corresponding to the $2^{nd}$ host read command CM2 to the host system 1000, the host system 1000 sends the next command (i.e., the $4^{th}$ host read command CM4). Then, the memory management unit 204 instantly transfers the data corresponding to the $4^{th}$ host read command CM4 to the host system 1000.

Figure 8A:
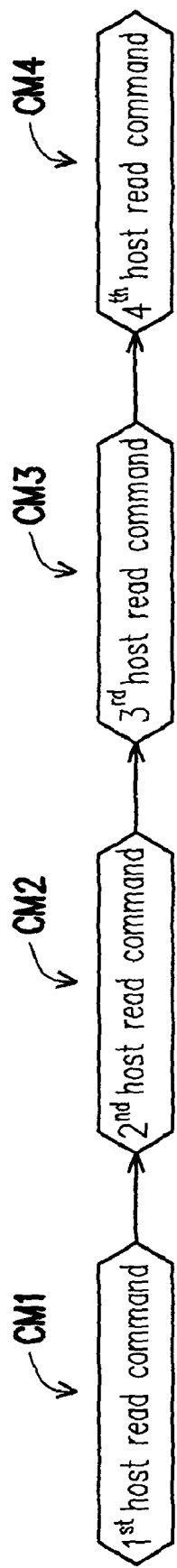
FIGS. 8A~8C illustrate an example of how a memory management unit re-arranges host read commands and generates a command giving sequence according to the second exemplary embodiment of the present invention.
Figure 8B:
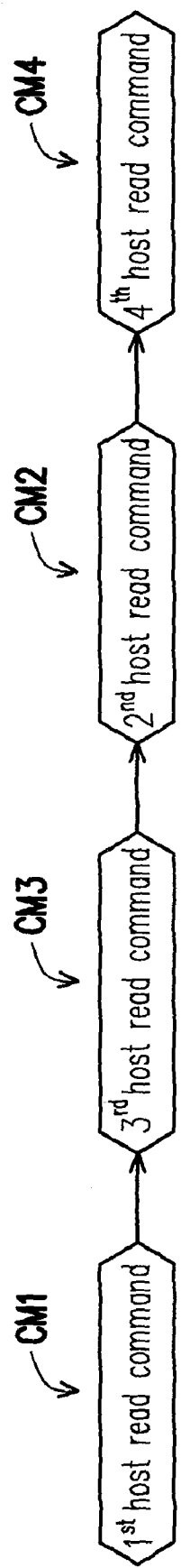
Figure 8C:
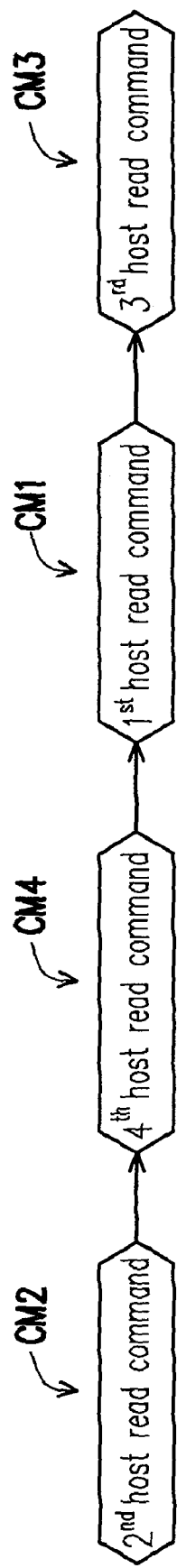

It should be mentioned that in the data read example described above, the logical blocks corresponding to the same data input/output bus belong to the same logical zone. However, the present invention is not limited thereto, and in another exemplary embodiment of the present invention, the logical blocks corresponding to different data input/output buses may also belong to the same logical zone. For example, in another exemplary embodiment, the logical block 350-(0) and the logical block 350-(G+1) belong to the logical zone 360-(0), and the logical block 350-(1) and the logical block 350-(G+2) belong to the logical zone 360-(1). In the data read example described above, after the memory management unit 204 arranges the host read commands sent by the host system 1000 according to the data input/output buses corresponding to the host read commands in the sequence of the $1^{st}$ host read command CM1, the $3^{rd}$ host read command CM3, the $2^{nd}$ host read command CM2, and the $4^{th}$ host read command CM4 (as shown in FIG. 8B), the memory management unit 204 first processes the $2^{nd}$ host read command CM2 or the $4^{th}$ host read command CM4 corresponding to the logical zone 360-(1) because the logical block-physical block mapping table 260-(1) corresponding to the logical zone 360-(1) is currently loaded in the buffer memory. Accordingly, data corresponding to the $1^{st}$ host read command CM1 and the $3^{rd}$ host read command CM3 can be simultaneously read from the flash memory chip 106, and data corresponding to the $2^{nd}$ host read command CM2 and the $4^{th}$ host read command CM4 can be simultaneously read from the flash memory chip 106. For example, the memory management unit 204 generates the command giving sequence in the sequence of the $2^{nd}$ host read command CM2, the $4^{th}$ host read command CM4, the $1^{st}$ host read command CM1, and the $3^{rd}$ host read command CM3 (as shown in FIG. 8C). Accordingly, the memory management unit 204 needs only to close the logical block-physical block mapping table 260-(1) and loads the logical block-physical block mapping table 260-(0) when it processes the $1^{st}$ host read command CM1 to obtain the related mapping information.

As described above, in the second exemplary embodiment of the present invention, the memory management unit 204 further generates the command giving sequence according to the logical zone corresponding to each host read command so that the number of times for switching the logical block-physical block mapping tables is reduced and accordingly the time for executing the host read commands is further shortened.

Figure 9:
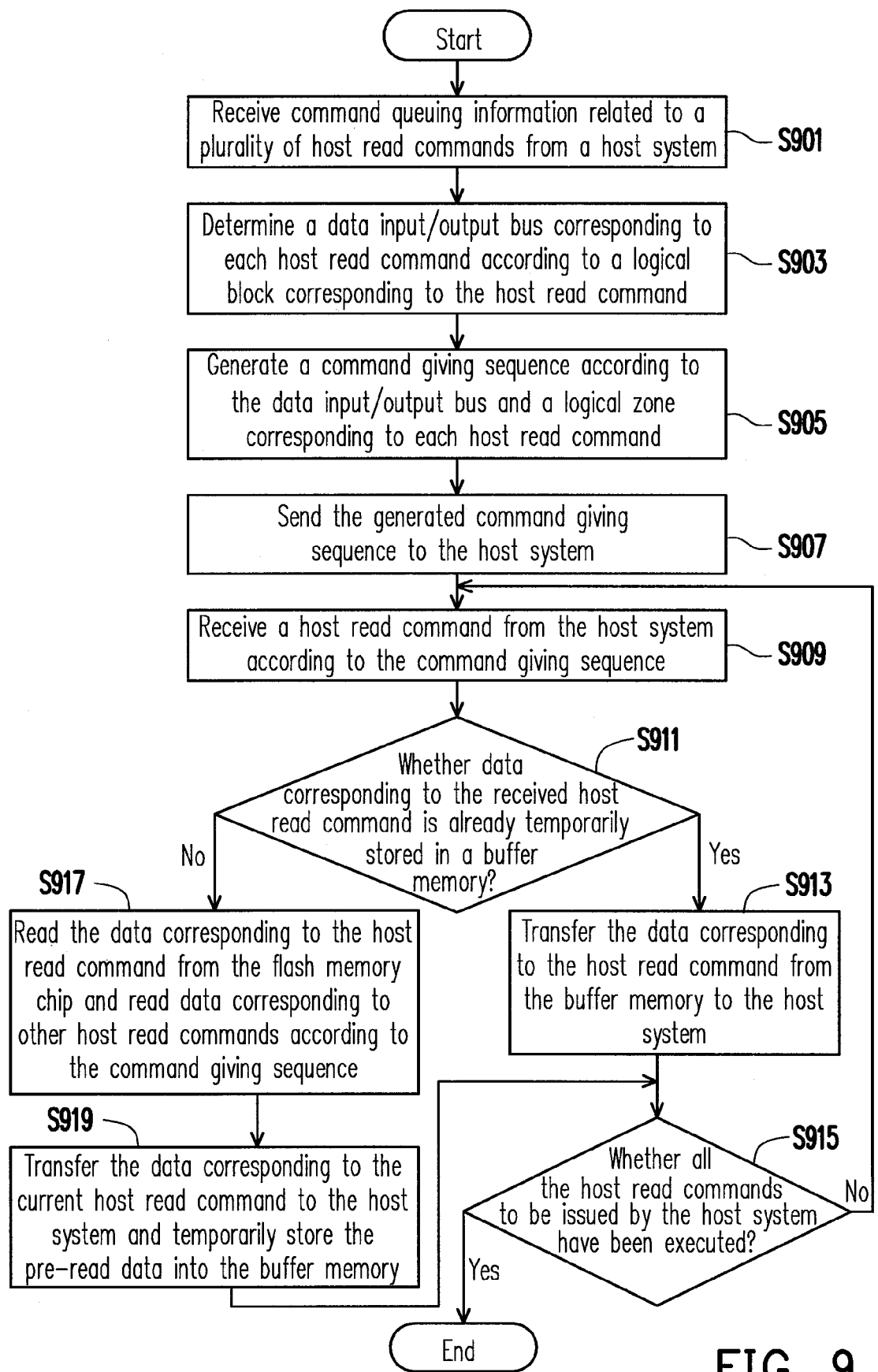
FIG. 9 is a flowchart of a data read method executed by a flash memory controller according to the second exemplary embodiment of the present invention.

FIG. 9 is a flowchart of a data read method executed by a flash memory controller according to the second exemplary embodiment of the present invention.

Referring to FIG. 9, the steps S901, S903, S907, S909, S911, S913, S915, S917, and S919 in FIG. 9 are the same as the steps S601, S603, S607, S609, S611, S613, S615, S617, and S619 in FIG. 6 therefore will not be described herein. The difference between FIG. 9 and FIG. 6 is that in the embodiment illustrated in FIG. 9, the flash memory controller 104 generates the command giving sequence according to the data input/output bus and the logical zone corresponding to each host read command (step S905).

It should be mentioned that even though two flash memory modules and two data input/output buses are disposed in the exemplary embodiments described above, the present invention is not limited thereto, and any number of flash memory modules or data input/output buses may be disposed.

As described above, in the data read method provided by an exemplary embodiment of the present invention, command queuing information related to a plurality of host read commands is received, the sequence for issuing these host read commands is re-arranged according to data input/output buses corresponding to these host read commands, and data corresponding to different host read commands is simultaneously read or pre-read through different data input/output buses. Thereby, the time for executing the host read commands is greatly shortened. Moreover, in the data read-method provided by another exemplary embodiment of the present invention, the sequence for issuing the host read commands is re-arranged further according to the logical zones corresponding to the host read commands besides the data input/output buses corresponding to the host read commands. Thereby, the number of times for switching the logical block-physical block mapping tables is reduced and accordingly the time for executing the host read commands is further shortened. The previously described exemplary embodiments of the present invention have many advantages, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data read method, for processing a plurality of host read commands from a host system by using a flash memory controller to read data corresponding to the host read commands from a plurality of flash memory modules, wherein the flash memory controller is coupled to the flash memory modules respectively through a plurality of data input/output buses, and each of the flash memory modules has a plurality of physical blocks, the data read method comprising:

configuring a plurality of logical blocks, wherein the logical blocks are mapped to a part of the physical blocks in the flash memory modules;

receiving command queuing information related to the host read commands from the host system, wherein each of the host read commands corresponds to one of the logical blocks, and each of the logical blocks corresponds to one of the data input/output buses;

re-arranging the host read commands and generating a command giving sequence according to the data input/output buses corresponding to the host read commands;

sending the command giving sequence to the host system; and sequentially receiving the host read commands from the host system according to the command giving sequence, and reading the data corresponding to the host read commands from the flash memory modules according to the host read commands.

2. The data read method according to claim 1, wherein the step of receiving the command queuing information related to the host read commands from the host system comprises:

receiving the command queuing information related to the host read commands from the host system by using a native command queuing (NCQ) protocol.

3. The data read method according to claim 1, wherein the step of sequentially receiving the host read commands from the host system according to the command giving sequence and reading the data corresponding to the host read commands from the flash memory modules according to the host read commands comprises:

when a first host read command among the host read commands is received from the host system, simultaneously reading data corresponding to the first host read command and data corresponding to at least one second host read command among the host read commands from the flash memory modules through the data input/output buses, wherein the first host read command and the second host read command are corresponding to different data input/output buses among the data input/output buses; and transferring the data corresponding to the first host read command to the host system.

4. The data read method according to claim 3 further comprising temporarily storing the data corresponding to the second host read command into a buffer memory of the flash memory controller.

5. The data read method according to claim 4, wherein the step of sequentially receiving the host read commands from the host system according to the command giving sequence and reading the data corresponding to the host read commands from the flash memory modules according to the host read commands further comprises:

when the second host read command is received from the host system, transferring the data corresponding to the second host read command from the buffer memory to the host system.

6. The data read method according to claim 4 further comprising:

grouping the logical blocks into a plurality of logical zones, and configuring a logical block-physical block mapping table for each of the logical zones, wherein each of the logical blocks is corresponding to one of the logical block-physical block mapping tables; and loading one of the logical block-physical block mapping tables into the buffer memory.

7. The data read method according to claim 6, wherein the step of re-arranging the host read commands and generating the command giving sequence according to the data input/output buses corresponding to the host read commands comprises:

re-arranging the host read commands and generating the command giving sequence according to the data input/output buses and the logical zones corresponding to the host read commands.

8. The data read method according to claim 7, wherein the step of re-arranging the host read commands and generating the command giving sequence according to the data input/output buses and the logical zones corresponding to the host read commands comprises:

giving priority to at least one of the host read commands in the command giving sequence, wherein the logical block corresponding to the at least one host read command is corresponding to the logical block-physical block mapping table loaded into the buffer memory.

9. A flash memory controller, for processing a plurality of host read commands from a host system to read data corresponding to the host read commands from a plurality of flash memory modules, wherein each of the flash memory modules has a plurality of physical blocks, the flash memory controller comprising:

a microprocessor unit;

a flash memory interface unit, coupled to the microprocessor unit and coupled to the flash memory modules through a plurality of data input/output buses;

a host interface unit, coupled to the microprocessor unit and connected to the host system; and a memory management unit, coupled to the microprocessor unit and wherein the memory management unit configures a plurality of logical blocks, wherein the logical blocks are mapped to a part of the physical blocks in the flash memory modules, wherein the memory management unit receives command queuing information related to the host read commands from the host system through the host interface unit, wherein each of the host read commands corresponds to one of the logical blocks, and each of the logical blocks corresponds to one of the data input/output buses, wherein the memory management unit re-arranges the host read commands, generates a command giving sequence according to the data input/output buses corresponding to the host read commands and sends the command giving sequence to the host system, wherein the memory management unit sequentially receives the host read commands from the host system through the host interface unit according to the command giving sequence and reads the data corresponding to the host read commands from the flash memory modules through the flash memory interface unit according to the host read commands.

10. The flash memory controller according to claim 9, wherein the host interface unit supports a NCQ protocol.

11. The flash memory controller according to claim 9, wherein when the host interface unit receives a first host read command among the host read commands from the host system, the memory management unit simultaneously reads data corresponding to the first host read command and data corresponding to at least one second host read command among the host read commands from the flash memory modules through the data input/output buses and transfers the data corresponding to the first host read command to the host system, wherein the first host read command and the second host read command are corresponding to different data input/output buses among the data input/output buses.

12. The flash memory controller according to claim 11 further comprising a buffer memory coupled to the microprocessor unit, wherein the memory management unit temporarily stores the data corresponding to the second host read command into the buffer memory.

13. The flash memory controller according to claim 12, wherein when the memory management unit receives the second host read command from the host system, the memory management unit transfers the data corresponding to the second host read command from the buffer memory to the host system.

14. The flash memory controller according to claim 12, wherein the memory management unit groups the logical blocks into a plurality of logical zones and configures a logical block-physical block mapping table for each of the logical zones, wherein each of the logical blocks is corresponding to one of the logical block-physical block mapping tables, wherein the memory management unit loads one of the logical block-physical block mapping tables into the buffer memory.

15. The flash memory controller according to claim 14, wherein the memory management unit further re-arranges the host read commands and generates the command giving sequence according to the data input/output buses and the logical zones corresponding to the host read commands.

16. The flash memory controller according to claim 15, wherein the memory management unit gives priority to at least one of the host read commands in the command giving sequence, wherein the logical block corresponding to the at least one host read command is corresponding to the logical block-physical block mapping table loaded into the buffer memory.

17. A flash memory storage system, comprising:
- a flash memory chip, having a plurality of flash memory modules, wherein each of the flash memory modules has a plurality of physical blocks;
- a flash memory controller, coupled to the flash memory modules through a plurality of data input/output buses, wherein the flash memory controller configures a plurality of logical blocks, wherein the logical blocks are mapped to a part of the physical blocks in the flash memory modules; and
- a connector, coupled to the flash memory controller, and coupled to a host system,
- wherein the flash memory controller receives command queuing information related to a plurality of host read commands from the host system through the connector, wherein each of the host read commands corresponds to one of the logical blocks, and each of the logical blocks corresponds to one of the data input/output buses,
- wherein the flash memory controller re-arranges the host read commands and generates a command giving sequence according to the data input/output buses corresponding to the host read commands and sends the command giving sequence to the host system,
- wherein the flash memory controller sequentially receives the host read commands from the host system through the connector according to the command giving sequence and reads data corresponding to the host read commands from the flash memory modules through the data input/output buses according to the host read commands.

18. The flash memory storage system according to claim 17, wherein the connector supports a NCQ protocol.

19. The flash memory storage system according to claim 17, wherein when the flash memory controller receives a first host read command among the host read commands from the host system, the flash memory controller simultaneously reads data corresponding to the first host read command and data corresponding to at least one second host read command among the host read commands from the flash memory modules through the data input/output buses and transfers the data corresponding to the first host read command to the host system,
- wherein the first host read command and the second host read command are corresponding to different data input/output buses among the data input/output buses.

20. The flash memory storage system according to claim 19 further comprising a buffer memory, wherein the flash memory controller temporarily stores the data corresponding to the second host read command into the buffer memory.

21. The flash memory storage system according to claim 20, wherein when the flash memory controller receives the second host read command from the host system, the flash memory controller transfers the data corresponding to the second host read command from the buffer memory to the host system.

22. The flash memory storage system according to claim 20, wherein the flash memory controller groups the logical blocks into a plurality of logical zones and configures a logical block-physical block mapping table for each of the logical zones, wherein each of the logical blocks is corresponding to one of the logical block-physical block mapping tables,
- wherein the flash memory controller loads one of the logical block-physical block mapping tables into the buffer memory.

23. The flash memory storage system according to claim 22, wherein the flash memory controller further re-arranges the host read commands and generates the command giving sequence according to the data input/output buses and the logical zones corresponding to the host read commands.

24. The flash memory storage system according to claim 23, wherein the flash memory controller gives priority to at least one of the host read commands in the command giving sequence, wherein the logical block corresponding to the at least one host read command is corresponding to the logical block-physical block mapping table loaded into the buffer memory.

25. The flash memory storage system according to claim 20, wherein the buffer memory is disposed in the flash memory controller.

* * * * *